United States Patent
Chen et al.

(10) Patent No.: US 12,323,660 B2
(45) Date of Patent: Jun. 3, 2025

(54) MEDIA DOCKING DEVICE AND MEDIA TRANSFER METHOD

(71) Applicant: Realtek Semiconductor Corporation, Hsinchu (TW)

(72) Inventors: Chien-Wei Chen, Hsinchu (TW); Tsung-Han Li, Hsinchu (TW); You-Wen Chiou, Hsinchu (TW); Kuan-Chi Chou, Hsinchu (TW); Bo Yu Lai, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 133 days.

(21) Appl. No.: 18/480,525

(22) Filed: Oct. 4, 2023

(65) Prior Publication Data

US 2024/0114207 A1     Apr. 4, 2024

Related U.S. Application Data

(60) Provisional application No. 63/381,137, filed on Oct. 27, 2022, provisional application No. 63/378,239, filed on Oct. 4, 2022.

(30) Foreign Application Priority Data

Apr. 12, 2023    (TW) ................................ 112113678
Apr. 25, 2023    (TW) ................................ 112115410

(51) Int. Cl.
*H04N 21/454*     (2011.01)
*G06F 1/16*        (2006.01)
(Continued)

(52) U.S. Cl.
CPC ......... *H04N 21/454* (2013.01); *G06F 1/1632* (2013.01); *G06F 3/1407* (2013.01);
(Continued)

(58) Field of Classification Search
CPC ............ H04N 21/454; H04N 21/43632; G06F 1/1632; G06F 13/382; G06F 13/4282; G06F 21/31; G06F 21/32
See application file for complete search history.

(56) References Cited

U.S. PATENT DOCUMENTS 9,883,544 B1 *   1/2018   Marquardt ............ H04W 76/10
2009/0063744 A1 *   3/2009   Krueger ................ G06F 9/4411
                                                                       710/303

(Continued)

FOREIGN PATENT DOCUMENTS

| CN | 109644290 A | 4/2019 |
| CN | 111324561 A | 6/2020 |
| CN | 114079743 A | 2/2022 |

*Primary Examiner* — Mulugeta Mengesha
(74) *Attorney, Agent, or Firm* — CKC & Partners Co., LLC (57) ABSTRACT

A media docking device includes an input module, an output module and a processing module. The input module is electrically connected to a media source device for receiving media data. The output module is electrically connected to a media play device. The processing module determines if an instruction is received from the media source device or a remote device. If the instruction is not received, the processing module transfers the media data to the output module to transmit to the media play device. If the instruction is received, the processing module limits a transmission of the media data according to the instruction, such that the media data will not be completely played by the media play device.

18 Claims, 8 Drawing Sheets

(51) Int. Cl.
  *G06F 3/14* (2006.01)
  *G06F 13/38* (2006.01)
  *G06F 13/42* (2006.01)
  *G06F 21/31* (2013.01)
  *G06F 21/32* (2013.01)
  *H04N 21/4363* (2011.01)

(52) U.S. Cl.
  CPC ........ *G06F 13/382* (2013.01); *G06F 13/4282* (2013.01); *G06F 21/31* (2013.01); *G06F 21/32* (2013.01); *H04N 21/43632* (2013.01); *G06F 2213/0042* (2013.01)

(56) References Cited

U.S. PATENT DOCUMENTS

2013/0113697 A1* 5/2013 Chang .................. G06F 3/1431
  345/156
2015/0087272 A1 3/2015 Palamara et al.

* cited by examiner

MEDIA DOCKING DEVICE AND MEDIA TRANSFER METHOD

RELATED APPLICATIONS

This application claims priority to U.S. Provisional Application Ser. No. 63/378,239 filed Oct. 4, 2022, U.S. Provisional Application Ser. No. 63/381,137 filed Oct. 27, 2022, Taiwan Application Serial Number 112113678, filed Apr. 12, 2023, and Taiwan Application Serial Number 112115410, filed Apr. 25, 2023, the disclosures of which are incorporated herein by reference in their entireties.

BACKGROUND

Field of Invention

The present disclosure relates to a media docking device for controlling transmission of media data.

Description of Related Art

In business and office use, it has become common to use a docking station to connect a notebook computer to multiple displays. A user can move the notebook computer to different locations where the docking stations and displays are set up, making it convenient to use larger screens. How to make the docking station provide richer functions is an issue concerned by people in the art.

SUMMARY

Embodiments of the present disclosure provide a media docking device including an input module, an output module and a processing module. The input module is configured to be electrically connected to a media source device to receive media data from the media source device. The output module is configured to be electrically connected to a media play device. The processing module is electrically connected to the input module and the output module, and configured to determine if an instruction is received from the media source device or a remote device. If the instruction is not received, the processing module is configured to transfer the media data to the output module so as to transmit the media data to the media play device. If the instruction is received, the processing module is configured to limit a transmission of the media data according to the instruction such that the media data is not completely played (e.g., displayed) by the media play device.

From another aspect, embodiments of the present disclosure provide a media transfer method performed by a media docking device. The media transfer method includes: receiving media data from a media source device; determining if an instruction is received from the media source device or a remote device; if the instruction is not received, transferring the media data to an output module so as to transmit the media data to a media play device; and if the instruction is received, limiting a transmission of the media data according to the instruction such that the media data is not completely played by the media play device.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1A:
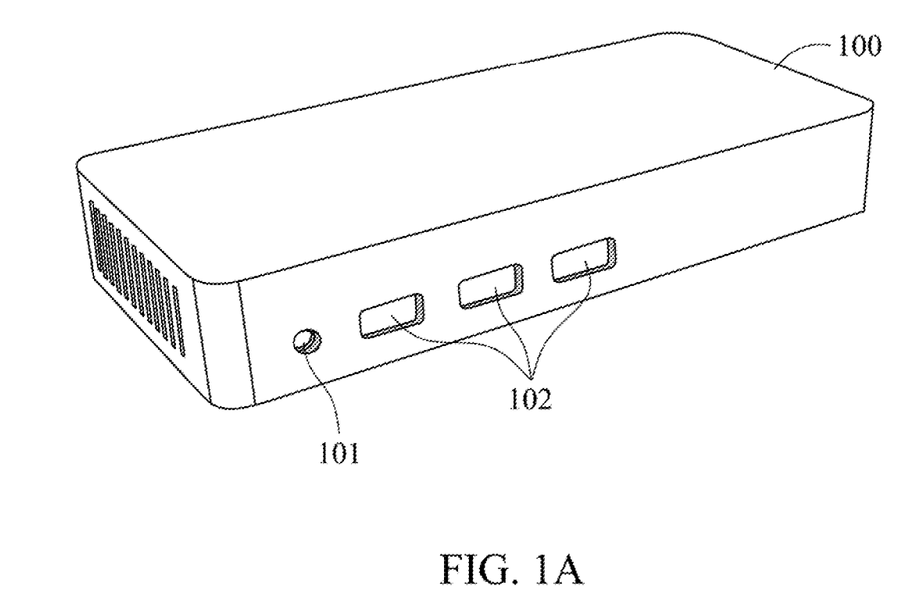
FIG. 1A and FIG. 1B are diagrams illustrating external views of a media docking device 100 according to an embodiment.
Figure 1B:
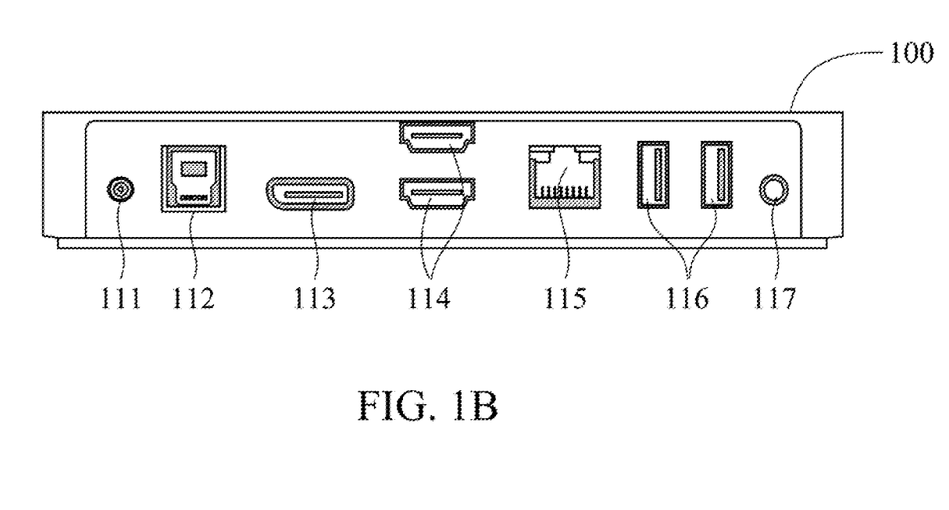
Figure 2:
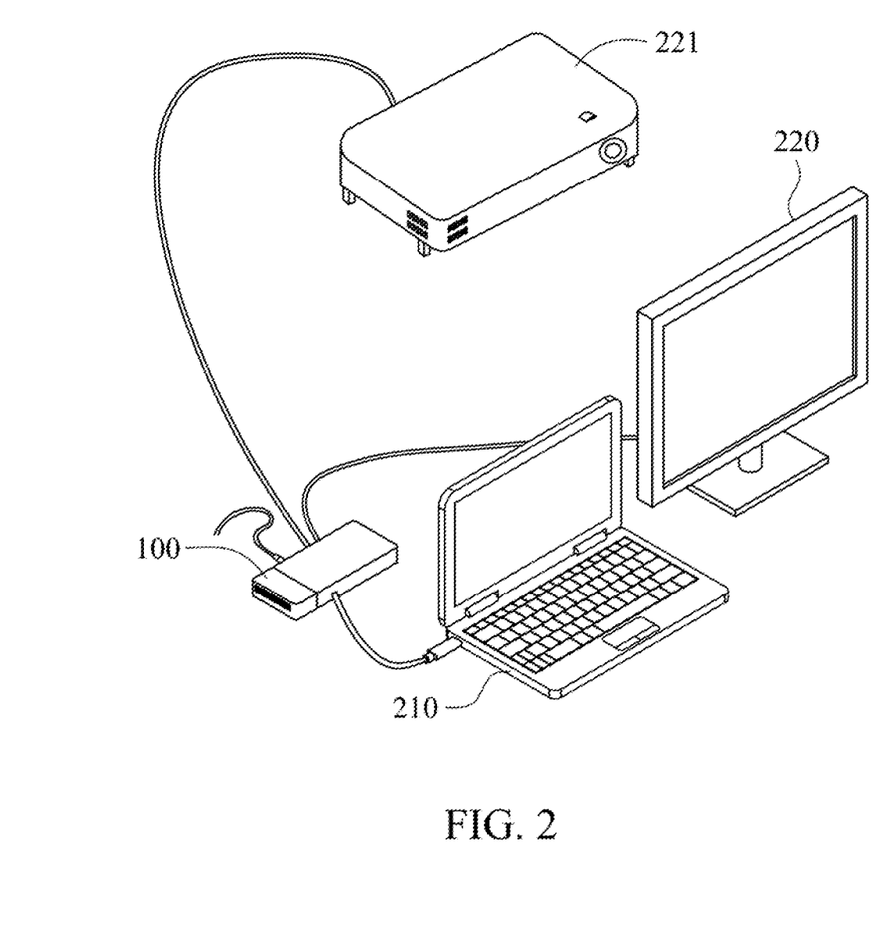
FIG. 2 illustrates a usage scenario of the media docking device 100.

FIG. 1A and FIG. 1B are diagrams illustrating external views of a media docking device 100 according to an embodiment. In the examples of FIG. 1A and FIG. 1B, a front side of the media docking device 100 includes a combo aux interface 101 and multiple Universal Serial Bus (USB) interfaces 102. A back side of the media docking device 100 includes a power interface 111, a Universal Serial Bus (type-B) interface 112, a display port (DP) interface 113, a High Definition Multimedia Interface (HDMI) interface 114, an Ethernet interface 115, a Universal Serial Bus (type-A) interface 116, and an audio output interface 117. FIG. 2 illustrates a usage scenario of the media docking device 100, which is electrically connected to a media source device 210 and two media play (e.g., playback, display) devices 220 and 221. The media source device 210, for example, can be a notebook computer, while the media play devices 220 and 221 can be a display screen and a projector, respectively. The media source device 210 provides media data, which can include audio signals, video signals, or data signals, that are transmitted via the media docking device 100 to the media play devices 220 and 221.

Types, number, and placement of the interfaces on the media docking device 100 described above are merely examples, and the present disclosure is not limited to these configurations. In some embodiments, the media docking device 100 is implemented as an internal circuit or an external add-on device of an electronic device. The present disclosure also does not limit a size and appearance of the media docking device 100. In other embodiments, the media source device 210 is an electronic product such as a smartphone, a tablet, or a desktop computer.

Figure 3:
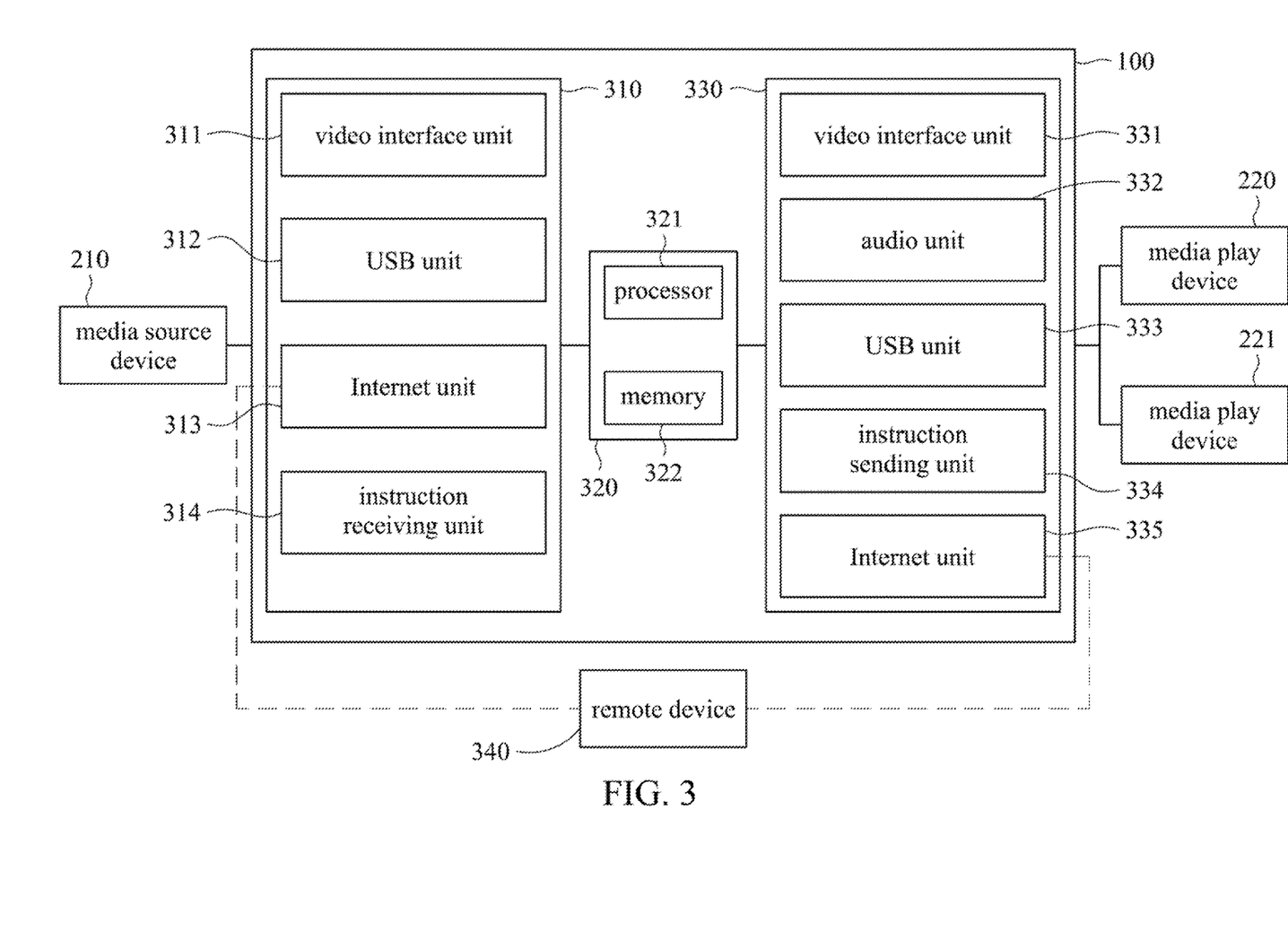
FIG. 3 illustrates a schematic diagram of internal circuitry of the media docking device according to an embodiment.

FIG. 3 is a schematic diagram of an internal circuitry of the media docking device 100 according to an embodiment. Referring to FIG. 3, the media docking device 100 includes an input module 310, a processing module 320, and an output module 330. The processing module 320 is electrically connected to the input module 310 and the output module 330. The input module 310 is used to be electrically connected to the media source device 210 and to receive media data from the media source device 210. The output module 330 is used to be electrically connected to the media play devices 220 and 221.

The input module 310 includes a video interface unit 311, a Universal Serial Bus (USB) unit 312, an Internet unit 313, and an instruction receiving unit 314. The video interface unit 311, for example, is a circuit that complies with specifications of DisplayPort (DP), High-Definition Multimedia Interface (HDMI), or Digital Visual Interface (DVI). The USB unit 312 is a circuit that complies with the USB specifications. The Internet unit 313 is a circuit that complies with the Ethernet specifications. The instruction receiving unit 314 is configured to receive instructions from the media source device 210. In some embodiments, the instruction receiving unit 314 is a circuit under a structure of the video interface unit 311 or the USB unit 312. For example, the HDMI specification defines Consumer Electronics Control (CEC), which can be used to transmit instructions. Therefore, the instruction receiving unit 314 may be hardware or firmware that complies with the CEC specification. Alternatively, the instruction receiving unit 314 can also be integrated with the USB. In some embodiments, the media docking device 100 is implemented on a circuit board, and the instruction receiving unit 314 is implemented as an Inter-Integrated Circuit ($I^2C$). In some embodiments, the instruction receiving unit 314 is a Display Data Channel Command Interface (DDCCI). In some embodiments, the input module 310 also includes circuits that comply with communication specifications such as cellular network, near field communication, infrared communication, Bluetooth, and wireless fidelity (Wi-Fi). In some embodiments, the input module 310 also includes interfaces such as fiber optic interfaces and Musical Instrument Digital Interface (MIDI). In some embodiments, the USB unit 312 or other unit may be omitted. The interfaces and buses described above are merely examples, and the present disclosure is not limited to the embodiments described above.

The processing module 320 includes a processor 321 and a memory 322. The processor 321 may be a central processing unit, a microprocessor, microcontroller, an application-specific integrated circuit, or the like. The memory 322 can be random access memory, read-only memory, flash memory, or the like. In some embodiments, the memory 120 may be omitted or disposed inside the processor 321.

The output module 330 includes a video interface unit 331, an audio unit 332, a USB unit 333, an instruction sending unit 334, and an Internet unit 335. The video interface unit 331, the USB unit 333, the instruction sending unit 334, and the Internet unit 335 are similar to the video interface unit 311, the USB unit 312, the instruction receiving unit 314, and the Internet unit 313 respectively, but are used to send the media data. In some embodiments, the instruction sending unit 334 and the Internet unit 335 are integrated with the instruction receiving unit 314 and the Internet unit 313, respectively. The audio unit 332 may be a TRS (Tip-Ring-Sleeve) or a TS (Tip-Sleeve) terminal, or an interface that complies with the MIDI specification. However, the present disclosure is not limited to these embodiments.

The remote device 340 is communicatively connected to the Internet unit 313, and examples of the remote device 340 include a personal computer, a server, a smartphone, etc. An application, browser, or any suitable software is executed on the remote device 340 for providing an interface for users. The users can issue instructions to the media docking device 100 through this interface. In some implementations, the users can input the instructions through a touchpad, a mouse, a keyboard, or other input device(s) included in the media source device 210, and these instructions will also be sent to the media docking device 100. The input module 310 also receives media data from the media source device 210. The processing module 320 determines whether it has received an instruction from the media source device 210 or the remote device 340. If no instruction is received, the processing module 320 transfers the media data to the output module 330, which then sends the media data to the media play devices 220 and 221. If an instruction is received, the processing module 320 limits transmission of the media data according to the instruction, so that the media data is not completely played (e.g., played) by the media play device 220 and/or the media play device 221. In one scenario, the media docking device 100 is set up in a store, and when a staff wants to show the media play devices 220 and 221 to customers, he or she can press a shortcut key on a keyboard. Accordingly, an instruction is sent from the media source device 210 to the media docking device 100 to limit the transmission of the media data, preventing the customers from seeing confidential contents.

Figure 4:
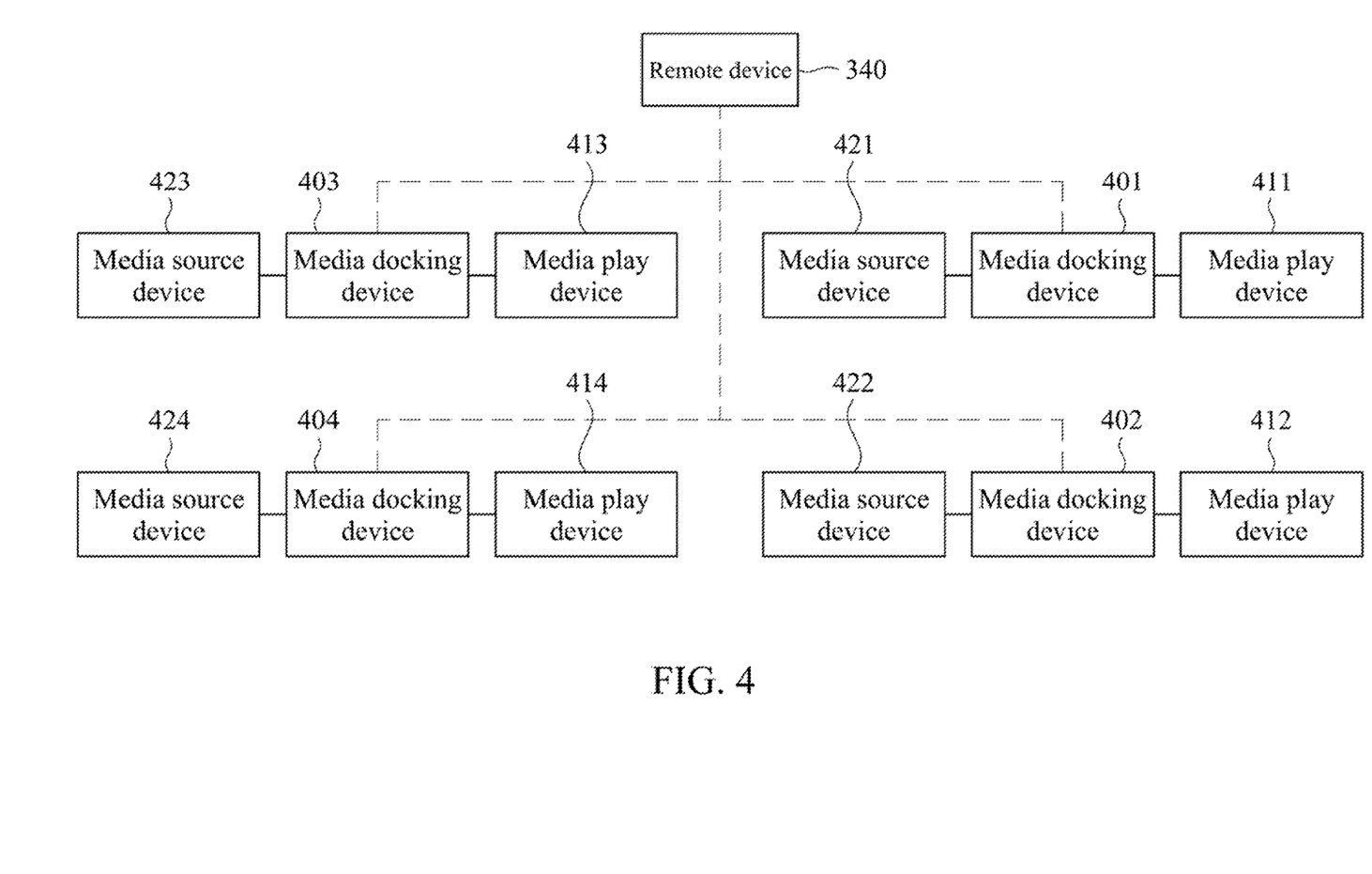
FIG. 4 illustrates a usage scenario of the media play device according to another embodiment.

FIG. 4 is a diagram illustrating a usage scenario of the media play device 100 according to another implementation. In FIG. 4, the remote device 340 is communicatively connected to media docking devices 401-404. The media docking devices 401-404 receive media data from media source devices 421-424, respectively, and transfer the corresponding media data to media play devices 411-414. A user can operate the remote device 340 to send instructions to any one or more of the media docking devices 401-404, to prevent the media data from being completely played by the corresponding media play devices 411-414. For example, this scenario occurs in a classroom, where the user of the remote device 340 is a teacher, and the users of the media docking devices 401-404 are students. Alternatively, this scenario may occur in an office, where the user of the remote device 340 is an information security staff, and the users of the media docking devices 401-404 are other employees, although the disclosure is not limited to these scenarios.

Referring to FIG. 3 for the following description of various implementations for limiting transmission of media data. In some implementations, the media data is video data which includes multiple frames (e.g., streams). These frames are to be shown on one or more media play devices. The processing module 320 may modify the content, brightness, and/or contrast ratio of one or more frames, so that the media data is not completely played by the media play devices 220 and 221. For example, content of a frame (e.g., stream) can be changed to a completely black frame, or text, patterns, numbers, etc. can be added to the frames. Alternatively, contrast ratio of the frame can be decreased or color tone can be changed to make it difficult for users to clearly see the original content of the frame.

In some implementations, the video data complies with the specifications of a digital display interface, such as DisplayPort (DP), High-Definition Multimedia Interface (HDMI), or Digital Visual Interface (DVI). The digital display interface defines many parameters, and the processing module 320 can modify one or more of these parameters so that the video data cannot be displayed properly. For example, a transport layer of the DisplayPort defines a blank identification, also referred to as Vertical Blanking or Horizontal Blanking. The blank identification is used to separate data from different frames and provide related parameters for these frames. Here, the blank identification is deliberately modified to incorrect content, making the frame unable to be displayed properly. Examples of modifiable parameters include Main Stream Attribute (MSA), Secondary-Data Packet (SDP), Vertical Blanking ID (VB-ID), Mvid, Maud, Data Island Packet, and other parameters.

In some implementations, the video data has a default scramble procedure and a default error correction procedure. This error correction procedure is, for example, forward error correction (FEC). When no instruction is received, the processing module 320 executes the default scramble procedure and the default error correction procedure. When an instruction is received, the scramble procedure executed by the processing module 320 is different from the default scramble procedure, or the error correction procedure executed by the processing module 320 is different from the default error correction procedure, so that the media data is not completely played by the media play devices 220 and 221. For example, the default requires executing a scramble procedure, but upon receiving the instruction, the processing module 320 chooses not to execute the scramble procedure. Alternatively, the default does not execute the scramble procedure but the processing module 320 chooses to execute the scramble procedure. Another example is that the default requires executing an error correction procedure, but after receiving the instruction, the processing module 320 chooses not to execute the error correction procedure. Alternatively, the default does not execute the error correction procedure, but the processing module 320 chooses to execute the error correction procedure. The processing module 320 can also deliberately execute the scramble procedure or error correction procedure incorrectly, so that the media play device cannot obtain the correct video data. For instance, adding too many incorrect error correction codes, or using different permutations for scrambling, causes the media play device to the video data to be incorrect and fail to recover it.

In some implementations, the processing module 320 can modify a communication authentication procedure between the output module 330 and the media play devices 220 and 221, so that a connection between the output module 330 and media play devices 220 and 221 cannot be established, preventing the media data from being completely played by the media play devices 220 and 221. For example, both the output module 330 and the media play devices 220 and 221 support the High-bandwidth Digital Content Protection (HDCP) protocol. This protocol defines exchanges of session keys during the communication authentication procedure. The processing module 320 can deliberately send incorrect session keys or not send session keys at all, causing the connection cannot be established. In implementations using High-Definition Multimedia Interface (HDMI) or DisplayPort (DP), a physical layer defines link training, which requires communication through I²C or AUX channel(s) allowing the media play devices 220 and 221 and the output module 330 to establish a channel for data transmission. The processing module 320 can deliberately send incorrect communication message(s) to prevent the connection from being established. Moreover, in DisplayPort implementations, reading and writing of DisplayPort Configuration Data (DPCD) addresses are used for the data transmission. The processing module 320 can write incorrect information to the DPCD addresses, preventing the connection from being established. Those with ordinary skill in the art should know what types of messages to be sent between the output module 330 and the media play devices 220 and 221 in various protocols to establish the connection, and incorrect messages may be deliberately sent or no message is sent at all to prevent the connection from being established. The approaches mentioned above can also be applied to the communication authentication procedure between the input module 310 and the media source device 210. Furthermore, in implementations using High-Definition Multimedia Interface (HDMI), it is also possible to reply modified Status and Control Data Channel (SCDC) values or to transmit modified Extended Display Identification Data (EDID), such that the media play devices 220 and 221 cannot light up or cannot display a specific resolution. For example, a specific resolution can be removed from the EDID of the media play devices 220 and 221 and then the modified EDID will be transmitted to the media source device 210, preventing the media source device 210 from sending frames at that specific resolution. Alternatively, the EDID can be modified so that the media source device 210 cannot recognize the media play devices 220 and 221 or misinterprets the display specifications, resulting in an abnormal display or displaying at a lower resolution. In some implementations, SCDC values can be modified to disrupt the normal display or limit the display to a lower resolution on the media play devices 220 and 221 through non-compliant communication modes.

In some implementations, the media play device 220 is a screen, and the processing module 320 can issue a display instruction to the media play device 220 to turn off operation (s) of at least one of a backlight module, a power supply, and a panel in the screen, preventing the media data from being played on the media play device 220. Alternatively, the processing module 320 can send a display instruction to the media play device 220 to modify parameters such as contrast ratio, color tone, brightness, etc., causing the media data to be played abnormally. In certain implementations, the aforementioned display instruction is transmitted through interfaces such as AUX or I²C.

In some embodiments, the media docking device 100 can enter a multi-stream transport (MST) mode, receive media data from the media source device 210 and transfer the same media data to the media play devices 220 and 221. Under the multi-stream transport mode, sideband message(s) is used to transmit information. Therefore, the sideband message(s) can be modified (e.g., changed to incorrect message(s)) to prevent the video data from being properly or completely played by the media play devices 220 and 221. Alternatively, one or more frames (e.g., streams) can be removed under the multi-stream transport mode.

In some embodiments, the media source device 210 transmits compressed video data, and the processing module 320 can modify one or more parameters in a display stream compression (DSC) to prevent the video data from being correctly decoded by the media play devices 220 and 221, resulting in the media data not being completely played by the media play devices 220 and 221. For example, the picture parameter set (PPS) can be modified to change a bit rate, and in some embodiments, quantization parameter(s) and other parameters can be modified.

Figure 5:
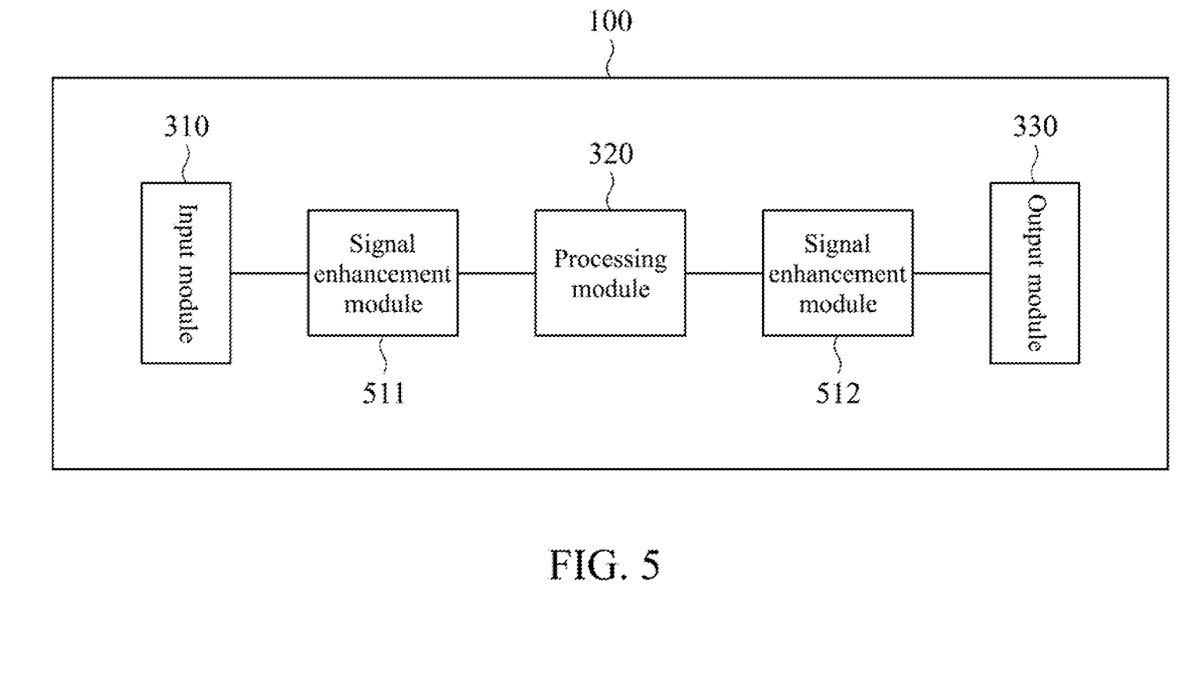
FIG. 5 is a schematic diagram illustrating the internal circuitry of a media docking device according to an embodiment.

FIG. 5 is a schematic diagram illustrating an internal circuitry of a media docking device according to an embodiment. In the embodiment of FIG. 5, the media docking device 100 also includes signal enhancement modules 511 and 512. The signal enhancement module 511 is disposed between the input module 310 and the processing module 320, while the signal enhancement module 512 is disposed between the output module 330 and the processing module 320. The signal enhancement modules 511 and 512 may include filters, equalizers, retimers, redrivers, switches, or the like. The signal enhancement modules 511 and 512 are used to perform enhancement procedures, such as noise reduction and channel compensation. The processing module 320 can control the signal enhancement modules 511 and 512 to modify the enhancement procedures, for example, by modifying parameters of the filters or the equalizers, which results in a decreased signal-to-noise ratio or a corrupted signal, preventing the media data from being completely played by the media play devices 220 and 221. The processing module 320 can control the signal enhancement circuits 511 and 512 through a general-purpose input/output (GPIO) or other common interface(s).

Figure 6:
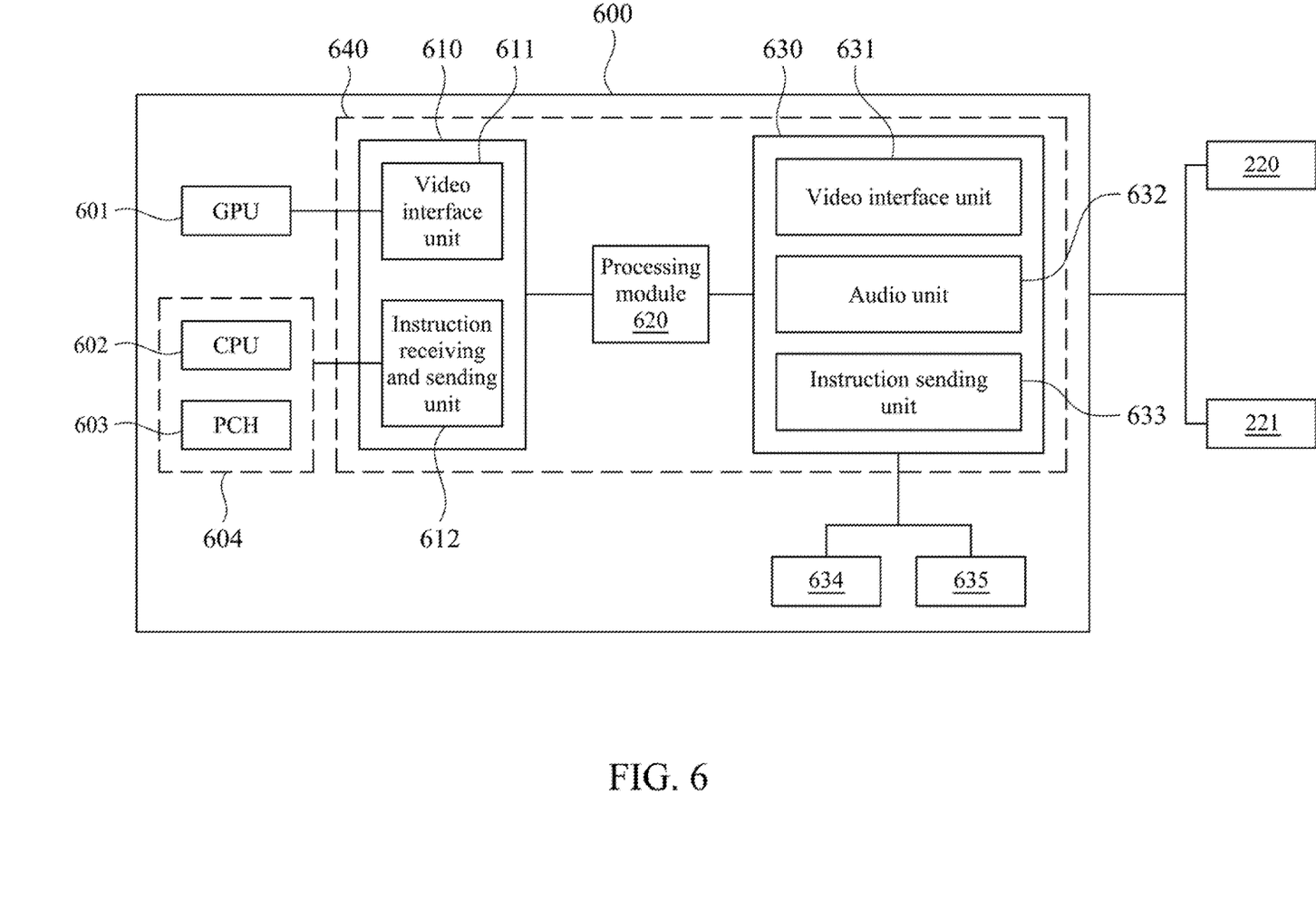
FIG. 6 is a schematic diagram illustrating the configuration of a media docking device according to an embodiment.

FIG. 6 is a schematic diagram illustrating a configuration of a media docking device according to an embodiment. In the embodiment of FIG. 6, the media docking device is integrated with the signal source device. Specifically, an electronic device 600 includes a central processing unit (CPU) 602, a graphics processing unit (GPU) 601, a platform controller hub (PCH) 603, and a media docking device 640.

The media docking device 640 is implemented as a chip installed in the electronic device 600. The media docking device 640 includes an input module 610, a processing module 620, and an output module 630. A video interface unit 611 in the input module 610 is electrically connected to the graphics processing unit 601. An instruction receiving and sending unit 612 is electrically connected to a system 604 including the central processing unit 602 and the platform controller hub 603. In this configuration, the system 604 and the graphics processing unit 601 are collectively referred to as the media source device. The instruction receiving and sending unit 612 can be, for example, an inter-integrated circuit ($I^2C$) bus circuit. Additionally, the electronic device 600 may also include a USB unit 634 and an Internet unit 635. Unlike in FIG. 1, the USB unit 634 and the Internet unit 635 are disposed outside the media docking device 640. The instruction sending unit 633 may be an inter-integrated circuit bus or another suitable communication interface. The video interface unit 611 is similar to the video interface unit 311 in FIG. 3, while the video interface unit 631 and the audio unit 632 are respectively similar to the video interface unit 331 and the audio unit 332 in FIG. 3, and further elaboration is not provided here. In the embodiment of FIG. 6, the processing module 620 sends a stop instruction to the system 604 through the instruction receiving and sending unit 612. Software or driver(s) running on the system 604 can control the graphics processing unit 601 to stop transmitting the media data, preventing the media data from being completely played by the media play devices 220 and 221, thus achieving the goal of limiting the transmission of the media data.

In some embodiments, a control unit (not shown) disposed in the input module 310, e.g., an independent video chip, is configured to provide another media data (referred to as second media data) to the processing module 320. After the processing module 320 determines to prevent the media data from being completely played by the media play devices 220 and 221 (e.g., according to the abovementioned embodiments), the processing module 320 switches reception of media data from the media source device 210 to the control unit. That is, the media source device 210 is replaced by the control unit. Thus, in instead of the media data received from the media source device 210, the second media data will be transferred to the media play devices 220 and 221. Then, the media play devices 220 and 221 play the second media data instead of the media data. In some embodiments, the second media data includes information for the users, such as texts or pictures indicating that a meeting is terminated or a firmware is being updated.

Referring back to FIG. 3, the various approaches for limiting the transmission of the media data can be executed by the processing module 320. In other embodiments, the various approaches for limiting the transmission of the media data can also be executed by an additional circuit (not shown), which is controlled by the processing module 320.

Figure 7:
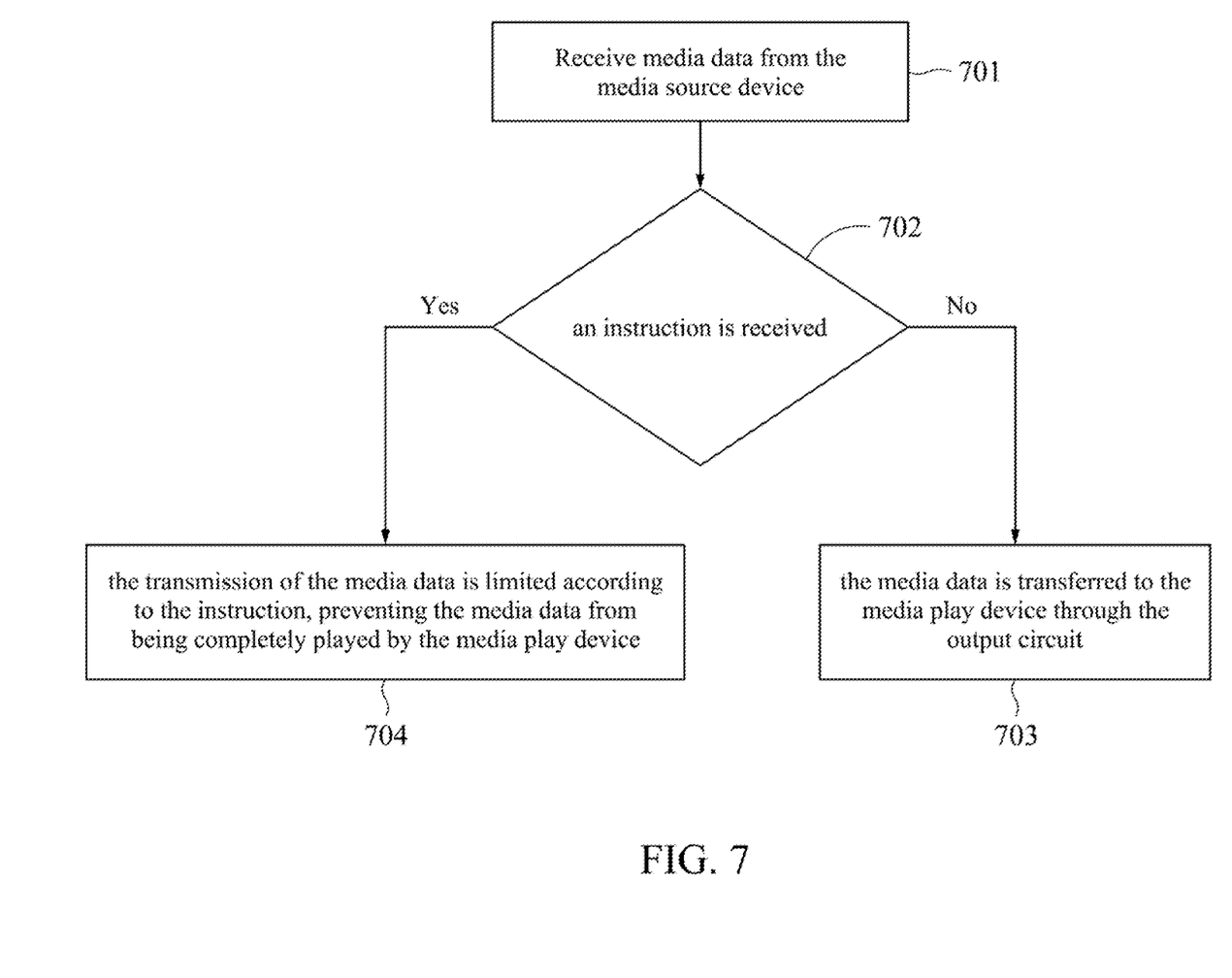
FIG. 7 is a flowchart illustrating a media transfer method according to an embodiment.

FIG. 7 is a flowchart illustrating a media transfer method according to an embodiment, which is executed by the aforementioned media docking device. Referring to FIG. 7, in step 701, media data is received from a media source device. In step 702, it is determined whether an instruction is received from the media source device or a remote device. If no instruction is received, in step 703, the media data is transferred to a media play device through an output module. If an instruction is received, in step 704, transmission of the media data is limited according to the instruction, preventing the media data from being completely played by the media play device. All the steps in FIG. 7 have been described in detail above, and therefore the description will not be repeated. Note that the steps in FIG. 7 can be implemented as program code(s) or circuit(s), and the disclosure is not limited thereto. In addition, the method in FIG. 7 can be performed in conjunction with the aforementioned embodiments, or can be performed alone. In other words, other steps may be inserted between the steps of the FIG. 7.

In the aforementioned media docking device and media transfer method, the users can control the transmission of the media data through the media source device or remotely. In this way, the data can be protected from leakage in some scenarios.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A media docking device comprising:
an input module, configured to be electrically connected to a media source device to receive media data from the media source device;
an output module, configured to be electrically connected to a media play device; and
a processing module, electrically connected to the input module and the output module, and configured to determine whether an instruction is received from the media source device or a remote device,
if the instruction is not received, the processing module is configured to transfer the media data to the output module so as to transmit the media data to the media play device,; if the instruction is received, the processing module is configured to limit a transmission of the media data according to the instruction to perform a scramble procedure or an error correction procedure such that the media data is not completely played by the media play device, wherein the scramble procedure is different from a default scramble procedure of the media data, and the error correction procedure is different from a default error correction procedure of the media data.

2. The media docking device of claim 1, wherein the media data is video data which complies with a specification of a digital display interface, the digital display interface defines a blank identification, and the processing module is configured to modify the blank identification such that the media data is not completely played by the media play device.

3. The media docking device of claim 1, wherein the media data is video data comprising a frame, and the processing module is configured to modify at least one of content, brightness and contrast ratio of the frame such that the media data is not completely played by the media play device.

4. The media docking device of claim 1, wherein the processing module is configured to modify a communication authentication procedure between the output module and the media play device such that a connection between the output module and the media play device is not established and the media data is not completely played by the media play device.

5. The media docking device of claim 1, further comprising:
a signal enhancement module, configured to perform an enhancement procedure on the media data,
wherein the processing module is configured to control the signal enhancement module to decrease a signal-to-noise ratio of the media data such that the media data is not completely played by the media play device.

6. The media docking device of claim 1, wherein the processing module is configured to transmit a display instruction to the media play device to turn off a backlight module of the media play device or decrease a contrast ratio of the media play device.

7. The media docking device of claim 1, wherein the media data is video data,
wherein in a multi stream transport mode, the processing module is configured to modify a sideband message such that the video data is not completely played by the media play device.

8. The media docking device of claim 1, wherein the media data is compressed video data, and the processing module is configured to modify a parameter of a display stream compression such that the compressed video data is not correctly decoded by the media play device and the media data is not completely played by the media play device.

9. The media docking device of claim 1, wherein the input module comprises:
a control unit, configured to provide another media data to the processing module, wherein the processing module is configured to transfer the another media data instead of the media data to the output module such that the media data is not played by the media play device.

10. A media transfer method performed by a media docking device, the media transfer method comprising:
receiving media data from a media source device;
determining whether an instruction is received from the media source device or a remote device;
if the instruction is not received, transferring the media data to an output module so as to transmit the media data to a media play device; and
if the instruction is received, the processing module is configured to limit a transmission of the media data according to the instruction to perform a scramble procedure or an error correction procedure such that the media data is not completely played by the media play device, wherein the scramble procedure is different from a default scramble procedure of the media data, and the error correction procedure is different from a default error correction procedure of the media data.

11. The media transfer method of claim 10, wherein the media data is video data which complies with a specification of a digital display interface, the digital display interface defines a blank identification, and the step of limiting the transmission of the media data according to the instruction comprises:
modifying the blank identification such that the media data is not completely played by the media play device.

12. The media transfer method of claim 10, wherein the media data is video data comprising a frame, and the step of limiting the transmission of the media data according to the instruction comprises:
modifying at least one of content, brightness and contrast ratio of the frame such that the media data is not completely played by the media play device.

13. The media transfer method of claim 10, wherein the step of limiting the transmission of the media data according to the instruction comprises:
modifying a communication authentication procedure between the output module and the media play device such that a connection between the output module and the media play device is not established and the media data is not completely played by the media play device.

14. The media transfer method of claim 10, wherein the step of limiting the transmission of the media data according to the instruction comprises:
controlling a signal enhancement module to decrease a signal-to-noise ratio of the media data such that the media data is not completely played by the media play device.

15. The media transfer method of claim 10, wherein the step of limiting the transmission of the media data according to the instruction comprises:
transmitting a display instruction to the media play device to turn off a backlight module of the media play device or decrease a contrast ratio of the media play device.

16. The media transfer method of claim 10, wherein the media data is video data, the step of limiting the transmission of the media data according to the instruction comprises:
in a multi stream transport mode, modifying a sideband message such that the video data is not completely played by the media play device.

17. The media transfer method of claim 10, wherein the media data is compressed video data, and the step of limiting the transmission of the media data according to the instruction comprises:
modifying a parameter of a display stream compression such that the compressed video data is not correctly decoded by the media play device and the media data is not completely played by the media play device.

18. The media transfer method of claim 10, wherein the step of limiting the transmission of the media data according to the instruction comprises:
transferring another media data provided by a control unit instead of the media data to the output module such that the media data is not played by the media play device.

* * * * *